United States Patent
Lee

(10) Patent No.: US 10,339,383 B2
(45) Date of Patent: Jul. 2, 2019

(54) METHOD AND SYSTEM FOR PROVIDING AUGMENTED REALITY CONTENTS BY USING USER EDITING IMAGE

(71) Applicant: DS GLOBAL, Seoul (KR)

(72) Inventor: Sam Hee Lee, Bucheon-si (KR)

(73) Assignee: DS GLOBAL, Geumcheon-Gu Seoul (KR)

( * ) Notice: Subject to any disclaimer, the term of this patent is extended or adjusted under 35 U.S.C. 154(b) by 0 days.

(21) Appl. No.: 15/784,524

(22) Filed: Oct. 16, 2017

(65) Prior Publication Data

US 2018/0107876 A1 Apr. 19, 2018

(30) Foreign Application Priority Data

Oct. 18, 2016 (KR) .................. 10-2016-0134913

(51) Int. Cl.
| | | |
|---|---|---|
| *G06T 11/60* | (2006.01) | |
| *G06T 11/00* | (2006.01) | |
| *G06F 3/12* | (2006.01) | |
| *G06K 9/00* | (2006.01) | |
| *G06T 19/00* | (2011.01) | |

(52) U.S. Cl.
CPC ....... *G06K 9/00671* (2013.01); *G06F 3/1243* (2013.01); *G06T 11/00* (2013.01); *G06T 11/60* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2014/0368533 A1* | 12/2014 | Salter | .................. | G02B 27/017 345/619 |
| 2015/0221343 A1* | 8/2015 | Yamaji | .............. | G06F 17/30831 386/241 |
| 2015/0302623 A1* | 10/2015 | Ishikawa | .............. | G06K 9/2063 345/629 |

FOREIGN PATENT DOCUMENTS

| | | |
|---|---|---|
| KR | 101197630 | 11/2012 |
| KR | 101539087 | 7/2015 |

OTHER PUBLICATIONS

Karissa Bell; "Twitter's photo filters just got more like Instagrann's;" Dec. 2, 2014; www.mashable.com; pp. 1-3; https://mashable.com/2014/12/02/twitter-photo-filter-update/#NG2wzIF7Raqd (Year: 2014).*

(Continued)

*Primary Examiner* — Peter Hoang
(74) *Attorney, Agent, or Firm* — Cantor Colburn LLP

(57) ABSTRACT

Provided are a method and system for providing augmented reality content using a user-edited image. The method of providing AR using a user-edited image includes adding a frame including a plurality of markers to an image captured by a camera unit or an already captured image by executing an application installed on the terminal, requesting a printing apparatus to print the image to which the frame has been added, obtaining an image by photographing the printed matter printed by the printing apparatus by executing the application, identifying a marker in the obtained image and requesting an AR object and AR object attribute data corresponding to the marker from an AR content providing server, and displaying the AR object received from the AR content providing server.

7 Claims, 6 Drawing Sheets

(56) References Cited

OTHER PUBLICATIONS

Mecanov Damjan; Youtube video: "Shindig Studio Photo Frame," May 3, 2016; https://www.youtube.com/watch?v=m1j3oqTy4Gs (Year: 2016).*

* cited by examiner

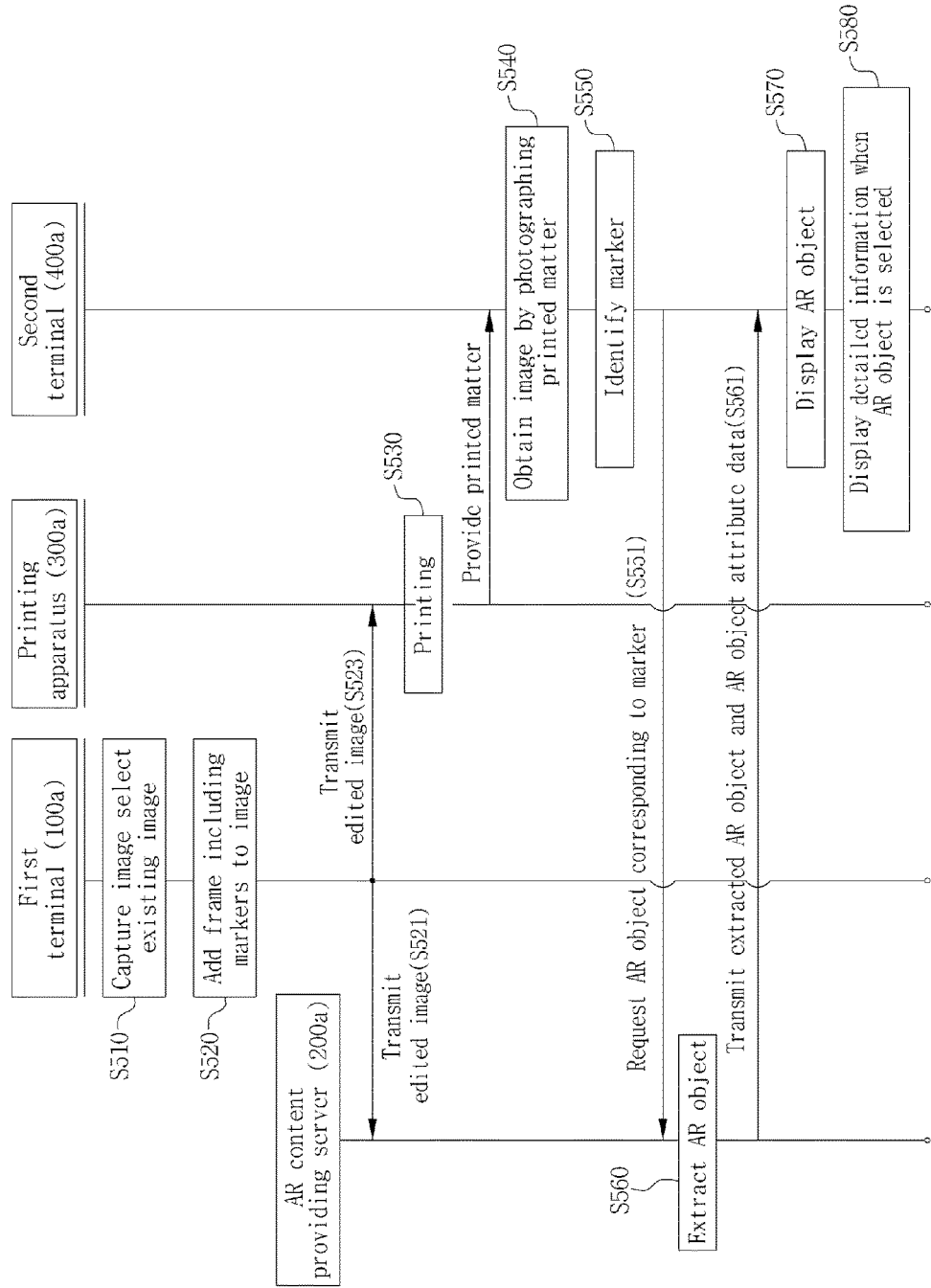

METHOD AND SYSTEM FOR PROVIDING AUGMENTED REALITY CONTENTS BY USING USER EDITING IMAGE

CROSS REFERENCE TO RELATED APPLICATION

The present application claims the benefit of Korean Patent Application No. 10-2016-0134913 filed in the Korean Intellectual Property Office on Oct. 18, 2016, the entire contents of which are incorporated herein by reference.

BACKGROUND OF THE INVENTION

1. Technical Field

The present invention relates to a method and system for providing augmented reality content and, more particularly, to a method and system for identifying a marker inserted by a user by directly editing an image and providing AR content corresponding to the identified marker to a terminal.

2. Description of the Related Art

Augmented reality (hereinafter referred to as "AR") is a technology in which the real world seen by a user with the naked eye is displayed by overlapping a virtual object on the real world. Unlike the existing virtual reality focused on only a virtual space and thing, the AR has a characteristic in that it can reinforce pieces of additional information that are difficult to obtained by only the real world by composing a virtual thing on the real world.

Korean Patent No. 10-1197630 (hereinafter referred to as "Patent Document 1") is an invention relating to a system for providing augmented content related to common content to a personal terminal. The invention provides a technology for providing a variety of types of individual augmented content related to common content to each user in real time without hindering watching while the common content provided to several persons is played back.

Furthermore, Korean Patent No. 10-1539087 (hereinafter referred to as "Patent Document 2") is a technology for interacting with augmented reality content by recognizing an operation of a subject person in a captured image.

However, Patent Document 1 suggests only the technology for generating personalized augmented content and providing individual augmented content through the generated personalized augmented content, and Patent Document 2 discloses only the technology for providing content based on a change in the location of a subject and a terminal.

SUMMARY OF THE INVENTION

An object of the present invention is to provide a method and system for identifying a marker included in an image directly edited by a user and providing a terminal with AR content corresponding to the identified marker.

A method for a terminal to provide AR using a user-edited image according to an embodiment of the present invention includes adding a frame including a plurality of markers to an image captured by a camera unit or an already captured image by executing an application installed on the terminal, requesting a printing apparatus to print the image to which the frame has been added, obtaining an image by photographing the printed matter printed by the printing apparatus by executing the application, identifying a marker in the obtained image and requesting an AR object and AR object attribute data corresponding to the marker from an AR content providing server, and displaying the AR object received from the AR content providing server.

A system for providing AR in a terminal using a user-edited image includes a portable terminal on which an application for identifying a marker and displaying an AR object corresponding to the marker has been installed, an AR content providing server configured to transmit the AR object and AR object attribute data corresponding to the marker from the portable terminal, and a printing apparatus configured to print an image received from the portable terminal. The portable terminal includes an image editing unit configured to add a frame including a plurality of markers to the image, a communication unit configured to transmit the edited image to the printing apparatus and the AR content providing server, a camera unit configured to obtain an image by photographing the printed matter provided by the printing apparatus, a marker identification unit configured to identify the marker in the obtained image, and a display unit configured to receive the AR object and the AR object attribute data from the AR content providing server and to display the AR object based on the AR object attribute data.

BRIEF DESCRIPTION OF THE DRAWINGS

FIG. 6 is a flowchart illustrating a method of providing augmented reality content using a user-edited image in accordance with another embodiment of the present invention.

DESCRIPTION OF REFERENCE NUMERALS

Figure 1:
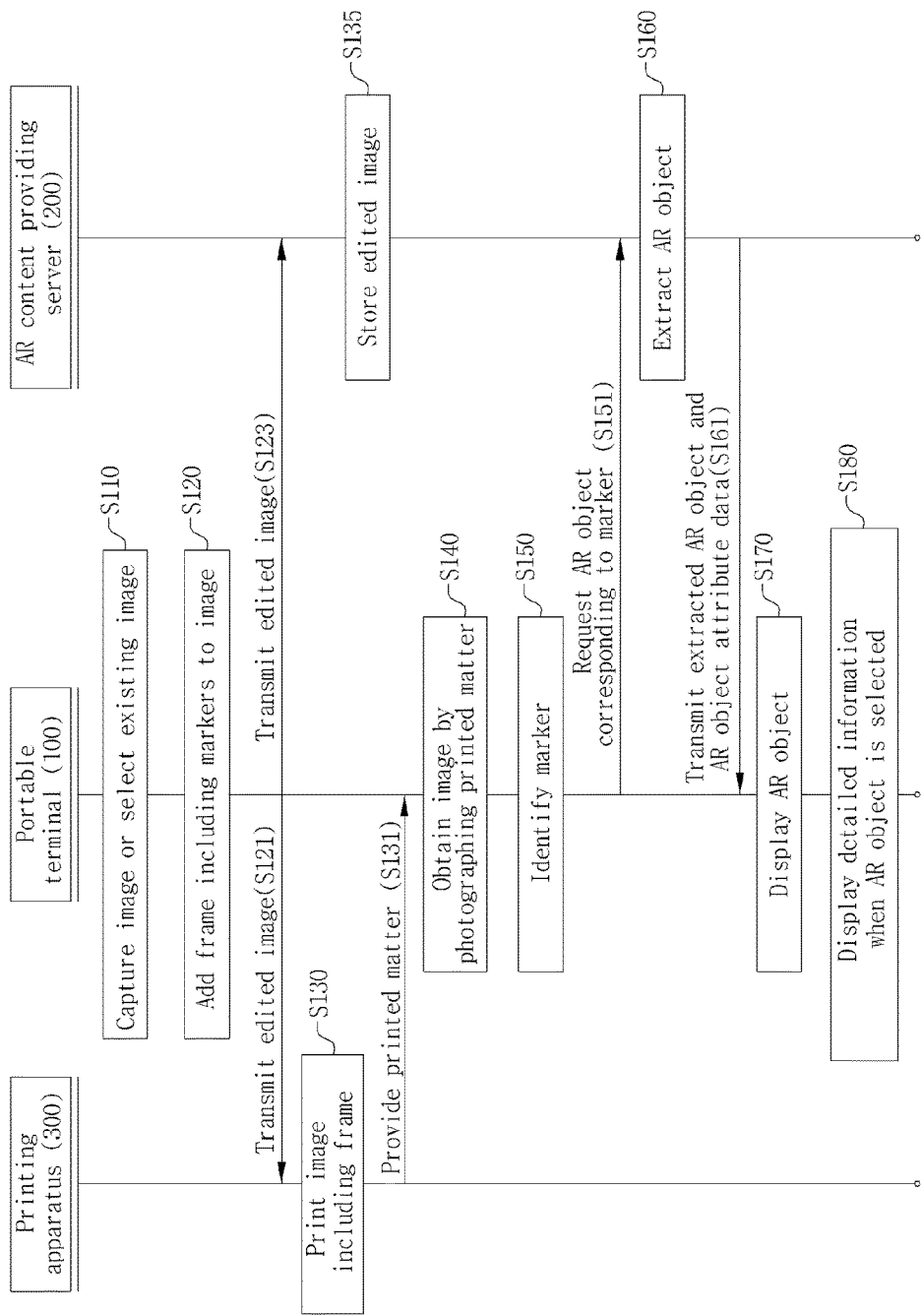
FIG. 1 is a flowchart illustrating a method of providing augmented reality content using a user-edited image according to an embodiment of the present invention.

100: portable terminal 110: camera unit
120: display unit
130: marker identification unit
140: communication unit 150: image editing unit
160: control unit
200: AR content providing server
300: printing apparatus

DETAILED DESCRIPTION

In embodiments according to the concept of the present invention disclosed in this specification, a specific structural or functional description has been merely illustrated for the purpose of describing the embodiments according to the concept of the present invention. The embodiments according to the concept of the present invention may be implemented in various forms and are not limited to the embodiments described in this specification.

The embodiments according to the concept of the present invention may be changed in various ways and may have various forms, and thus the embodiments are to be illustrated in the drawings and to be described in detail in this specification. However, this is not intended to limit the embodiments according to the concept of the present invention to specific disclosed forms and includes all of changes, equivalents or substitutes included in the spirit and technical scope of the present invention.

Terms used in this application are used to only describe specific embodiments and are not intended to restrict the present invention. An expression of the singular number includes an expression of the plural number unless clearly defined otherwise in the context. In this specification, terms, such as "include" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Hereinafter, the embodiments of the present invention are described in detail with reference to the drawings attached to this specification.

FIG. 1 is a flowchart illustrating a method of providing augmented reality content using a user-edited image according to an embodiment of the present invention.

Referring to FIG. 1, in the method of providing AR using a user-edited image, a portable terminal 100 captures an image through a camera unit or selects an already captured image (S110), and adds a frame including a plurality of markers to the image (S120).

Thereafter, the portable terminal 100 transmits the edited image to which the frame has been added to an AR content providing server 200 and a printing apparatus 300 (S121, S123). The printing apparatus 300 may print the received edited image (S130) and output the printed matter, and provides the printed matter to the user of the portable terminal 100 (S131). The AR content providing server 200 stores the received edited image in a database (S135).

The portable terminal 100 obtains an image by photographing the printed matter (S140), identifies a marker in the image (S150), and requests an AR object corresponding to the marker from the AR content providing server 200 (S151). The marker is a key connected to AR content, and various media may be used as the marker. For example, the marker may include specific images of printed matters, such as a movie poster, a specific web page screen and a newspaper booklet. In an embodiment, the marker may be an image frame directly edited by a user. When the marker is identified, the portable terminal 100 may extract the ID value of the corresponding marker and transfer information about the marker to the AR content providing server 200.

The AR content providing server 200 has stored AR content as 3D stereoscopic image information. The AR content providing server extracts the AR object, that is, the AR content corresponding to the marker, based on the previously stored edited image (S160), and transmits the extracted AR object and AR object attribute data (S161).

The AR object may include at least one of a dynamic image, a sound, text, a 2D image, a sticker and a moving image corresponding to the marker. The AR object attribute data may include the identifier of the AR object, coordinates where the AR object will be located, the category of the AR object, and detailed information about the AR object. The same identifier as that of the AR object may be assigned to the AR object attribute data.

The portable terminal 100 may display the AR object based on the identifier, coordinates, category and detailed information of the AR object attribute data received from the AR content providing server 200 by driving an AR application (S170).

When the user selects the AR object, the portable terminal 100 may display detailed information about the AR object (S180). The detailed information may be previously stored text.

That is, an embodiment of the present invention can provide AR content using a new method by capturing an image directly edited by a user, can provide AR content into which the personality of a user has been incorporated by identifying a marker included in an edited image and providing AR content corresponding to the marker.

Figure 2:
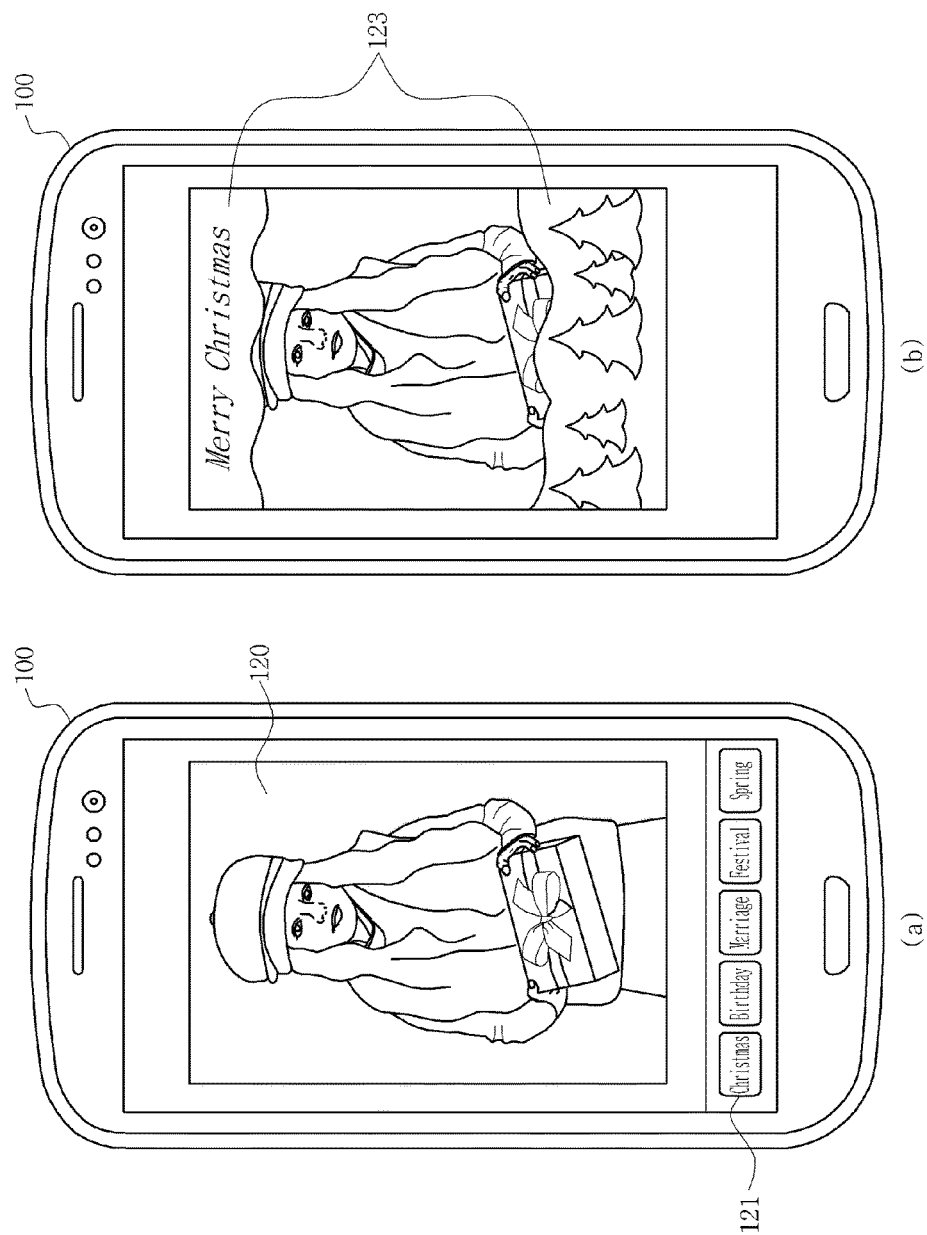
FIG. 2 is a diagram showing an image editing screen displayed on the display unit of a portable terminal and an image after editing in order to describe an embodiment of the present invention.

FIG. 2 is a diagram showing an image editing screen displayed on the display unit of the portable terminal and an image after editing in order to describe an embodiment of the present invention.

Referring to (a) and (b) of FIG. 2, the portable terminal 100 may select a photo and display the selected photo on a display unit 120. In an image editing screen mode, the portable terminal 100 may select a frame including a plurality of themes. For example, icons 121 may be arranged below the display unit 120, and the icons may be displayed so that the plurality of themes is selected. In this case, if "Christmas" is selected from the icons 121, a frame 123 including a marker indicative of an AR object related to Christmas may be added to an image after editing.

Figure 3:
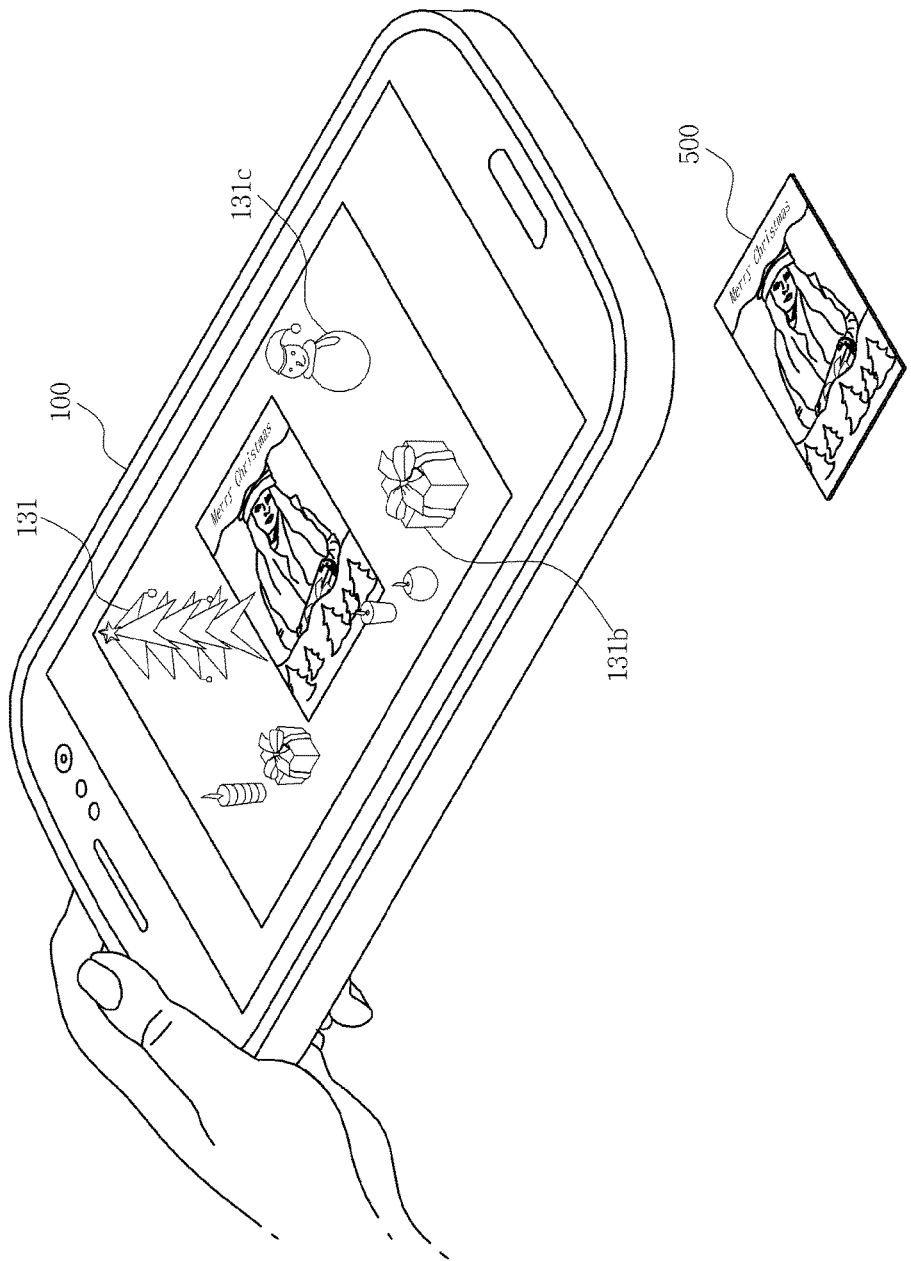
FIG. 3 is a diagram showing an AR image displayed on the display unit of the portable terminal in accordance with an embodiment of the present invention.

FIG. 3 is a diagram showing an AR image displayed on the display unit of the portable terminal in accordance with an embodiment of the present invention.

The portable terminal 100 photographs a printed matter 500 output by the printing apparatus. The marker identification unit of the portable terminal 100 identifies a marker included in the frame of the printed matter 500. The portable terminal 100 displays an AR object received from the AR content providing server 200.

The AR object may include at least one of a dynamic image, a sound, text, a 2D image, a sticker and a moving image corresponding to the marker. The AR object attribute data may include the identifier of the AR object, coordinates where the AR object will be located, the category of the AR object and detailed information about the AR object.

Figure 4:
FIG. 4 is a diagram showing an AR image displayed on the display unit of the portable terminal in accordance with another embodiment of the present invention.

FIG. 4 is a diagram showing an AR image displayed on the display unit of the portable terminal in accordance with another embodiment of the present invention.

Referring to FIG. 4, when a user selects an AR object 131a, detailed information 131d previously inputted by the user may be additionally displayed. For example, the detailed information 131d has been illustrated in a text form, but is not limited thereto. The detailed information 131d may additionally display video or an image related to the AR object 131a.

Figure 5:
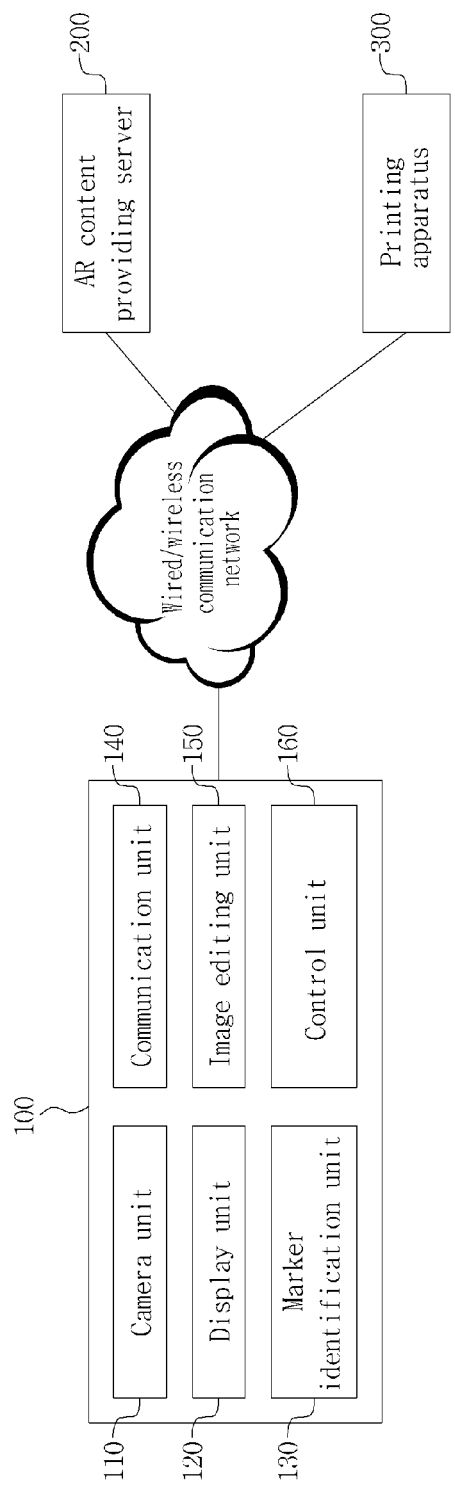
FIG. 5 is a block diagram showing the configuration of a system which serves the method of providing augmented reality content using a user-edited image according to an embodiment of the present invention.

FIG. 5 is a block diagram showing the configuration of a system which serves the method of providing augmented reality content using a user-edited image according to an embodiment of the present invention.

Referring to FIG. 5, the system according to an embodiment of the present invention includes the portable terminal 100, the AR content providing server 200 and the printing apparatus 300.

The portable terminal 100 includes a camera unit 110, a display unit 120, a marker identification unit 130, a communication unit 140, an image editing unit 150 and a control unit 160. The camera unit 110 may capture an image and store the captured image or may obtain an image by photographing a printed matter. The display unit 120 may display an image captured by the camera unit and an AR object. The scale of the AR object may be changed in response to a user input. For example, the display unit 120 may display closer interested information as the scale is reduced, and may display more interested information as the scale is increased.

The marker identification unit 130 may recognize a marker in an obtained image. The communication unit 140 may request an AR object corresponding to the marker from the AR content providing server 200. The marker is a key connected to AR content, and various media may be used as the marker. For example, the marker may include specific images of printed matters, such as a movie poster, a specific web page screen and a newspaper booklet. In an embodiment, the marker may be a frame edited by a user. When the marker is identified, the ID value of the corresponding marker may be extracted and information about the marker may be transferred to the AR content providing server 200.

The communication unit 140 may transfer an edited image to the printing apparatus 300 and receive an AR object and AR object attribute data from the AR content providing server.

The image editing unit 150 may add a frame, including a marker, to an image.

The control unit 160 controls the processing of a process related to the execution of application software and controls the operation of each of the elements of the portable terminal 100. The control unit 140 may control the processing of a process related to execution using a web browser through a world wide web in addition to application software.

An input unit (not shown) receives an input event executed by input means (not shown). The input unit may be a touch screen and transfers a touch event to the control unit 160. If the portable terminal 100 is a desktop PC or a laptop PC, the input unit may receive an input event of a mouse.

In the specification of the present invention, the portable terminal 100, that is, a computing device, is a mobile computing device which can execute a processor predetermined according to operating system software and various types of application software, can be easily carried and can be easily used while moving like a smartphone or a tablet PC, but is not limited thereto. A desktop PC or a laptop PC may be used as the portable terminal 100.

The AR content providing server 200 has stored AR content as 3D stereoscopic image information, may extract an AR object, that is, AR content corresponding to a marker, based on a previously stored edited image, and may transmit the extracted AR object and AR object attribute data.

The printing apparatus 300 is a portable printing apparatus equipped with short-distance wireless communication means. The printing apparatus 300 may print an image received from the portable terminal 100 through the short-distance wireless communication means, and may output the printed matter. The short-distance wireless communication means may be any one of short-distance wireless communication protocols, such as Bluetooth, radio frequency identification (RFID), infrared data association (IrDA), an ultra wideband (UWB), Zigbee (IEEE 802.15.4) and Wi-Fi, but is not limited thereto. The short-distance wireless communication means may be configured to receive an image through wired communication.

FIG. 6 is a flowchart illustrating a method of providing augmented reality content using a user-edited image in accordance with another embodiment of the present invention.

Referring to FIG. 6, in the method of providing AR in the terminal using a user-edited image, a first terminal 100*a* captures an image through the camera unit or selects an already captured image (S510), and adds a frame including a plurality of markers to the image (S520).

Thereafter, the first terminal 100*a* transmits the edited image to which the frame has been added to an AR content providing server 200*a* and a printing apparatus 300*a* (S521, S523). The printing apparatus 300*a* may print the received edited image and output the printed matter, and provides the printed matter to the user of a second terminal 400*a*. The AR content providing server 200*a* stores the received edited image in a database.

The second terminal 400*a* obtains an image by photographing the printed matter (S540), identifies a marker in the obtained image (S550), and requests an AR object corresponding to the marker from the AR content providing server 200*a* (S551).

The AR content providing server 200*a* extracts the AR object corresponding to the marker based on the previously stored edited image (S560), and transmits the extracted AR object and AR object attribute data (S561).

The AR object may include at least one of a dynamic image, a sound, text, a 2D image, a sticker and a moving image corresponding to the marker. The AR object attribute data may include the identifier of the AR object, coordinates where the AR object will be located, the category of the AR object and detailed information about the AR object.

The second terminal 400*a* may display the AR object based on the identifier, coordinates, category and detailed information of the AR object attribute data received from the AR content providing server 200 (S570). Furthermore, when a user selects the AR object, the second terminal 400*a* may display detailed information about the AR object (S580). The detailed information may be previously stored text.

Through the solving means, the present invention can capture an image directly edited by a user and provide AR content using a new method. In particular, the present invention can provide AR content having a high degree of satisfaction into which the personality of a user has been incorporated by identifying a marker included in an edited image and providing the AR content corresponding to the marker.

The present invention has been described in connection with the embodiments illustrated in the drawings, but the embodiments are only illustrative. A person having ordinary skill in the art to which the present invention pertains may understand that various modifications and other equivalent embodiments are possible. Accordingly, the true range of protection of the present invention should be determined by the technological spirit of the following claims.

What is claimed is:

1. A method for a terminal to provide augmented reality (AR) using a user-edited image, the method comprising:
   selecting a frame comprising a plurality of markers from a plurality of frames, wherein each of the plurality of frames comprises a different theme;
   adding the frame comprising the plurality of markers to an image captured by a camera unit or an already captured image by executing an application installed on the terminal;
   requesting a printing apparatus to print the image to which the frame has been added;

obtaining an image by photographing the printed matter printed by the printing apparatus by executing the application;

identifying a marker in the obtained image and requesting an AR object and AR object attribute data corresponding to the marker from an AR content providing server; and displaying the AR object received from the AR content providing server, wherein the user-edited image includes a plurality of markers indicating the AR object.

2. The method of claim 1, wherein the AR object comprises at least one of a dynamic image, a sound, text, a 2D image, a sticker and a moving image corresponding to the marker.

3. The method of claim 1, wherein the AR object attribute data comprises an identifier of the AR object, coordinates where the AR object is to be located, a category of the AR object and detailed information about the AR object.

4. The method of claim 1, further comprising displaying detailed information about the AR object received from the AR content providing server when a user selects the AR object.

5. A system for providing augmented reality (AR) in a terminal using a user-edited image of claim 1, the system comprising:

a portable terminal on which the application for identifying the marker and displaying the AR object corresponding to the marker has been installed;

an AR content providing server configured to transmit the AR object and AR object attribute data corresponding to the marker from the portable terminal; and a printing apparatus configured to print an image received from the portable terminal, the image received from the portable terminal being the image to which the frame has been added, wherein the portable terminal comprises:

an image editing unit configured to add the frame comprising a plurality of markers to the image;

a communication unit configured to transmit the edited image to the printing apparatus and the AR content providing server;

a camera unit configured to obtain the image captured by the camera unit by photographing the printed matter provided by the printing apparatus;

a marker identification unit configured to identify the marker in the obtained image; and a display unit configured to receive the AR object and the AR object attribute data from the AR content providing server and to display the AR object based on the AR object attribute data.

6. The system of claim 5, wherein the AR object comprises at least one of a dynamic image, a sound, text, a 2D image, a sticker and a moving image corresponding to the marker.

7. The system of claim 5, wherein the AR object attribute data comprises an identifier of the AR object, coordinates where the AR object is to be located, a category of the AR object and detailed information about the AR object.

* * * * *